(12) United States Patent
Chriss et al.

(10) Patent No.: US 12,106,312 B2
(45) Date of Patent: Oct. 1, 2024

(54) AUTOMATED GENERATION OF BEHAVIORAL SITELIST

(71) Applicant: T-Mobile Innovations LLC, Overland Park, KS (US)

(72) Inventors: Erica Dawn Chriss, Seattle, WA (US); Christopher Linn Kinsman, Redmond, WA (US); Stewart Andrew Renehan, Seattle, WA (US); Jessica Zhu, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 142 days.

(21) Appl. No.: 17/702,584

(22) Filed: Mar. 23, 2022

(65) Prior Publication Data
US 2023/0306446 A1 Sep. 28, 2023

(51) Int. Cl.
*G06Q 30/0201* (2023.01)
(52) U.S. Cl.
CPC .................................. *G06Q 30/0201* (2013.01)
(58) Field of Classification Search
CPC .................................................. G06Q 30/0201
See application file for complete search history.

(56) References Cited

U.S. PATENT DOCUMENTS

| | | | | |
|---|---|---|---|---|
| 9,734,515 | B1 * | 8/2017 | Belser | H04W 4/21 |
| 10,592,930 | B2 * | 3/2020 | Ramer | G06Q 30/0267 |
| 10,664,851 | B1 | 5/2020 | Barnes et al. | |
| 2013/0304586 | A1 * | 11/2013 | Angles | G06Q 30/0255 |
| | | | | 705/14.66 |
| 2017/0308924 | A1 * | 10/2017 | Jeon | G06Q 30/0269 |
| 2017/0330239 | A1 * | 11/2017 | Luo | G06N 20/10 |
| 2017/0344552 | A1 * | 11/2017 | Golbandi | G06F 16/9535 |
| 2019/0340656 | A1 * | 11/2019 | Orlandic | G06F 3/04817 |
| 2023/0093690 | A1 * | 3/2023 | Goggans | G06Q 30/0201 |
| | | | | 705/7.29 |
| 2023/0196407 | A1 * | 6/2023 | Gudai | G06F 16/9535 |
| | | | | 705/14.53 |

OTHER PUBLICATIONS

Morrison, Sara; The hidden trackers in your phone, explained; Jul. 8, 2020; Vox.com https://www.vox.com/recode/2020/7/8/21311533/sdks-tracking-data-location (Year: 2020).*

* cited by examiner

*Primary Examiner* — Dylan C White

(57) ABSTRACT

A method of generating a plurality of behavioral site lists. The method comprises receiving a plurality of interest category lists by a behavioral site list generation application executing on a computer system, wherein each interest category list comprises a plurality of pseudonymous subscriber identities associated with the pre-defined interest category; receiving a plurality of data on subscriber visits to web sites and on application identities by the application; generating behavioral site lists by the application based on determining over-indexing of pseudonymous subscriber identities provided in the data on subscriber visits to web sites and on application identities in the interest category lists, wherein each behavioral site list comprises a plurality of web site addresses and a plurality of application identities that are deemed to have an above average association to subscribers with an interest in the interest category associated with the behavioral site list.

18 Claims, 6 Drawing Sheets

AUTOMATED GENERATION OF BEHAVIORAL SITELIST

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Auxiliary content may be presented adjacent to the main screen of a browser or an application on a wireless communication device when a user of the device is consuming selected content in the form of web pages or mobile applications. The opportunity to present such auxiliary content is typically very fleeting and is competed among a plurality of auxiliary content providers. For example, in some cases the auxiliary content may be presented within about 500 milliseconds of the presentation of the content selected by the user of the wireless communication device. In that 500 milliseconds information about the opportunity is transmitted to one or more auxiliary content providers, each of the auxiliary content providers parse the information to evaluate the opportunity, the auxiliary content providers decide if they wish to bid and how much to bid to fulfill the opportunity by presenting its auxiliary content, the bid winner decides what auxiliary content to provide, and the bid winner transmits the auxiliary content to the wireless communication device for presentation. Desirably the auxiliary content providers target their auxiliary content to the interests of the user of the wireless communication device, whereby the likelihood that the user will be pleased with or interact with the auxiliary content is increased.

SUMMARY

In an embodiment, a system that generates site lists associated with interest categories based on associating a plurality of pseudonymous subscriber identities to different interest categories, receiving data on subscriber visits to web sites and on application identities, and identifying web sites and application sites for which pseudonymous subscriber identities associated with interest categories over-index on is disclosed. The system comprises a first data store comprising SDK data collected from SDKs installed on wireless communication devices subscribed to receive wireless communication service from a first wireless communication service provider; a second data store comprising broadband data collected from the wireless communication devices subscribed to receive wireless communication service from the first wireless communication service provider; a processor; and a non-transitory memory communicatively coupled to the processor. The system further comprises a behavioral persona generation application stored in the non-transitory memory that, when executed by the processor reads the SDK data from the first data store, reads the broadband data from the second data store, and generates a plurality of interest category lists, wherein each interest category list comprises a plurality of pseudonymous subscriber identities associated with an interest category and associated with the first wireless communication service provider. The system further comprises a behavioral site list generation application stored in the non-transitory memory that, when executed by the processor, receives the plurality of interest category lists created by the behavioral persona generation application, receives data on subscriber visits to web sites and on application identities from auxiliary content demand side platforms (programmatic platforms), wherein the data are associated with wireless communication devices subscribed to receive wireless communication service from the first wireless communication service provider, generates a plurality of behavioral site lists based on determining over-indexing of pseudonymous subscriber identities provided in the data on subscriber visits to web sites and on application identities in the interest category lists, wherein each behavioral site list is associated with an interest category and comprises a plurality of web site addresses and a plurality of application identities, and transmits the plurality of behavioral site lists to auxiliary content programmatic platforms.

In another embodiment, a method of generating a plurality of behavioral site lists associated with interest categories based on associating a plurality of pseudonymous subscriber identities to different interest categories, receiving data on subscriber visits to web sites and on application identities, and identifying web sites and application sites for which pseudonymous subscriber identities associated with interest categories over-index on is disclosed. The method comprises receiving SDK data from SDKs installed on wireless communication devices by a behavioral persona generation application executing on a computer system; receiving broadband data from wireless communication devices by the behavioral persona generation application; and generating a plurality of interest category lists based on the SDK data and based on the broadband data by the behavioral persona generation application, wherein each interest category list is associated with a pre-defined interest category and comprises a plurality of pseudonymous subscriber identities associated with the pre-defined interest category that are deemed to have a heightened interest in the pre-defined interest category. The method further comprises receiving the plurality of interest category lists by a behavioral site list generation application executing on the computer system; receiving a plurality of data on subscriber visits to web sites and on application identities by the behavioral site list generation application, wherein each data on a subscriber visit comprises a pseudonymous subscriber identity and one of an application identity or a web site address; generating behavioral site lists by the behavioral site list generation application based on determining over-indexing of pseudonymous subscriber identities provided in the data on subscriber visits to web sites and on application identities in the interest category lists, wherein each behavioral site list comprises a plurality of web site addresses and a plurality of application identities that are deemed to have an above average association to subscribers with an interest in the interest category associated with the behavioral site list; adapting the interest category lists by the behavioral site list generation application based on the data on subscriber visits to web sites and on application identities; and sending the plurality of behavioral site lists by the behavioral site list generation application to auxiliary content programmatic platforms.

In yet another embodiment, a method of generating a plurality of behavioral site lists associated with interest categories based on associating a plurality of pseudonymous subscriber identities to different interest categories, receiving data on subscriber visits to web sites and on application identities, and identifying web sites and application sites for which pseudonymous subscriber identities associated with interest categories over-index on is disclosed. The method comprises receiving a plurality of interest category lists by a behavioral site list generation application executing on a computer system, wherein each interest category list is associated with a pre-defined interest category and comprises a plurality of pseudonymous subscriber identities associated with the pre-defined interest category that are deemed to have a heightened interest in the pre-defined interest category; receiving a plurality of data on subscriber visits to web sites and on application identities by the behavioral site list generation application, wherein each data on a subscriber visit comprises a pseudonymous subscriber identity, information about a wireless communication device, and one of an application identity or a web site address. The method further comprises generating behavioral site lists by the behavioral site list generation application based on determining over-indexing of pseudonymous subscriber identities provided in the data on subscriber visits to web sites and on application identities in the interest category lists, wherein each behavioral site list comprises a plurality of web site addresses and a plurality of application identities that are deemed to have an above average association to subscribers with an interest in the interest category associated with the behavioral site list; and sending the plurality of behavioral site lists by the behavioral site list generation application to auxiliary content programmatic platforms.

In yet another embodiment, a system that automatically generates site lists associated with interest categories is disclosed. The system comprises a first data store comprising SDK data collected from SDKs installed on wireless communication devices subscribed to receive wireless communication service from a first wireless communication service provider, a second data store comprising broadband data collected from the wireless communication devices subscribed to receive wireless communication service from the first wireless communication service provider, a processor, and a non-transitory memory communicatively coupled to the processor. The system further comprises a behavioral persona generation application stored in the non-transitory memory that, when executed by the processor, reads the SDK data from the first data store, reads the broadband data from the second data store, and generates a plurality of interest category lists, wherein each interest category list comprises a plurality of pseudonymous subscriber identities associated with an interest category and associated with the first wireless communication service provider. The system further comprises a behavioral site list generation application stored in the non-transitory memory that, when executed by the processor, receives the plurality of interest category lists created by the behavioral persona generation application, receives bid request data from auxiliary content programmatic platforms, wherein the data on subscriber visits to web sites and on application identities are associated with wireless communication devices subscribed to receive wireless communication service from the first wireless communication service provider, adapts a behavioral site list machine learning model based on the plurality of interest category lists and based on the bid request data, generates a plurality of behavioral site lists based on the machine learning model, wherein each behavioral site list is associated with an interest category and comprises a plurality of web site addresses and a plurality of application identities, and transmits the plurality of behavioral site lists to auxiliary content programmatic platforms.

In yet another embodiment, a method of generating a plurality of behavioral site lists is disclosed. The method comprises receiving SDK data from SDKs installed on wireless communication devices by a behavioral persona generation application executing on a computer system, receiving broadband data from wireless communication devices by the behavioral persona generation application, and generating a plurality of interest category lists based on the SDK data and based on the broadband data by the behavioral persona generation application, wherein each interest category list is associated with a pre-defined interest category and comprises a plurality of pseudonymous subscriber identities associated with the pre-defined interest category that are deemed to have a heightened interest in the pre-defined interest category. The method further comprises receiving the plurality of interest category lists by a behavioral site list generation application executing on the computer system, receiving a plurality of data on subscriber visits to web sites and on application identities by the behavioral site list generation application, wherein each bid request comprises a pseudonymous subscriber identity and one of an application identity or a web site address, and adapting a behavioral site list machine learning model by the behavioral site list generation application based on the plurality of interest category lists and the plurality of data on subscriber visits to web sites and on application identities. The method further comprises generating behavioral site lists by the behavioral site list generation application based on the machine learning model, wherein each behavioral site list comprises a plurality of web site addresses and a plurality of application identities that are deemed to have an above average association to subscribers with an interest in the interest category associated with the behavioral site list, adapting the interest category lists by the behavioral site list generation application based on the bid request data and based on the machine learning model, and sending the plurality of behavioral site lists by the behavioral site list generation application to auxiliary content programmatic platforms.

In yet another embodiment, a method of generating a plurality of behavioral site lists is disclosed. The method comprises receiving a plurality of interest category lists by a behavioral site list generation application executing on a computer system, wherein each interest category list is associated with a pre-defined interest category and comprises a plurality of pseudonymous subscriber identities associated with the pre-defined interest category that are deemed to have a heightened interest in the pre-defined interest category and receiving a plurality of data on subscriber visits to web sites and on application identities by the behavioral site list generation application, wherein each bid request comprises a pseudonymous subscriber identity, information about a wireless communication device, and one of an application identity or a web site address. The method further comprises adapting a behavioral site list machine learning model by the behavioral site list generation application based on the plurality of interest category lists and the plurality of data on subscriber visits to web sites and on application identities, generating behavioral site lists by the behavioral site list generation application based on the machine learning model, wherein each behavioral site list comprises a plurality of web site addresses and a plurality of application identities that are deemed to have an above average association to subscribers with an interest in the interest category associated with the behavioral site list, and sending the plurality of behavioral site lists by the behavioral site list generation application to auxiliary content programmatic platforms.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
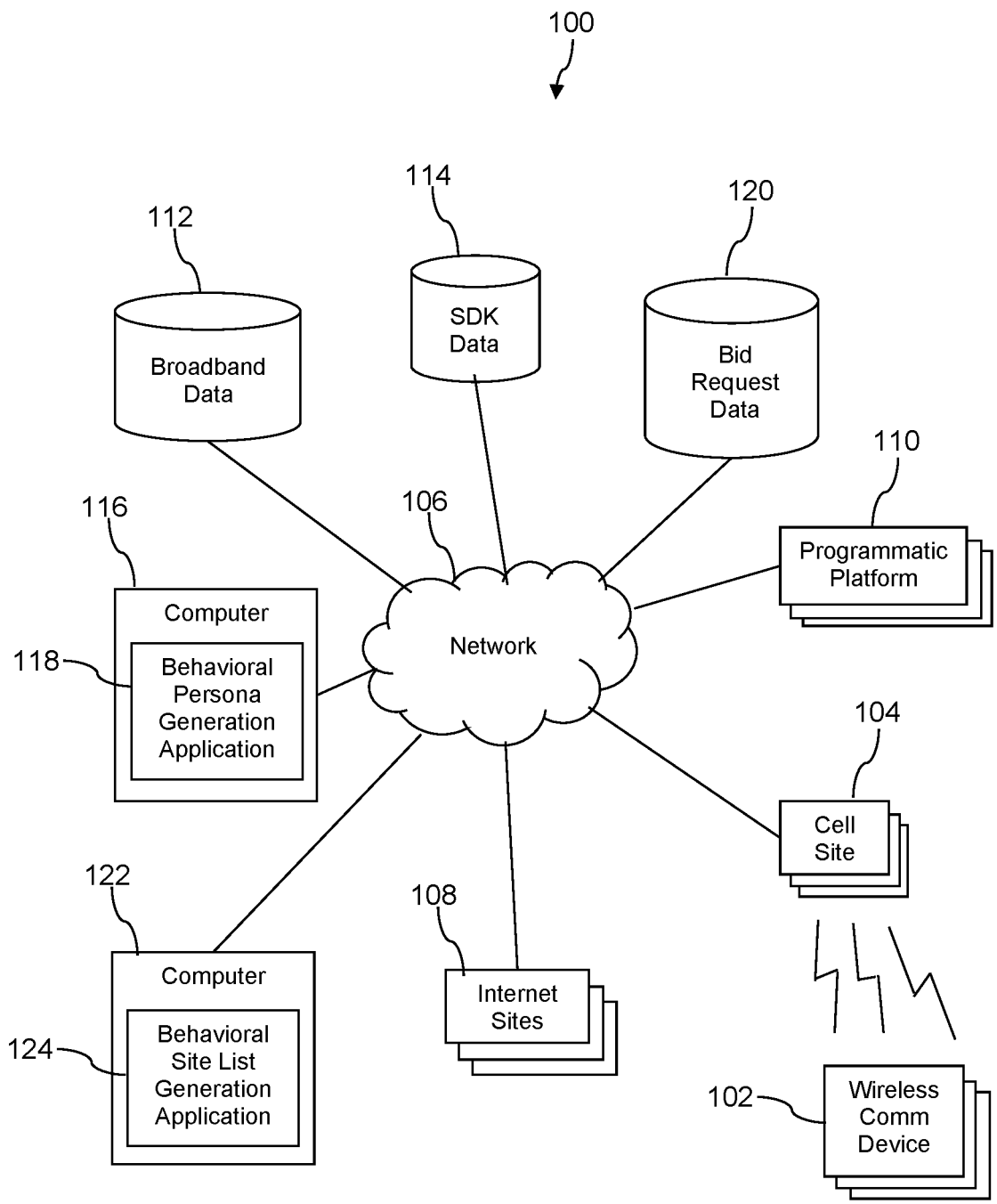
FIG. 1A and FIG. 1B are a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for assisting programmatic platforms such as demand side platforms (DSP), sell side platforms (SSPs), or exchanges to rapidly match an auxiliary content presentation opportunity, referred to herein more succinctly as a presentation opportunity, to an interest category. In the past, some programmatic platforms conducted complex real-time demographic analysis of presentation opportunities to attempt to evaluate if they wanted to bid or not. That process used information provided in bid requests to attempt to infer what kind of subscriber is associated with the wireless communication device that has the presentation opportunity, whereby to send targeted auxiliary content to the device. That process entailed very intense computer processing, disadvantageously consuming much computer resources. Cookies might have been analyzed to assist that real-time analysis, but cookies now are being deprecated and their use is decreasing. Some programmatic platform bid evaluation processes depended upon looking up a pseudonymous subscriber identity present in the bid request in a plurality of interest category lists having pseudonymous subscriber identities, whereby to send targeted auxiliary content to the device. But some wireless communication devices do not propagate a pseudonymous subscriber identity to the bid request. For example, IoS-based devices typically do not propagate the pseudonymous subscriber identity to the bid request (the IoS default is opt-out and most subscribers do not actively change this opt-out default to opt-in). The present disclosure teaches generation of behavioral site lists that can be used to associate presentation opportunities to interest categories even in the absence of a pseudonymous subscriber identity that can be looked-up in an interest category list, which overcomes the lack of pseudonymous subscriber identities, overcomes the lack of cookies, and significantly speeds the process of analyzing presentation opportunities. The present disclosure teaches a particular technical solution based on interest category specific lists of web sites and application identities to the technical problem of rapidly and accurately evaluating presentation opportunities.

When the programmatic platform knows the interest category or interest categories that are associated to a presentation opportunity (e.g., a subscriber or user associated with the wireless communication device that has the presentation opportunity is inferred to have an above average interest in the interest category or interest categories), the programmatic platform can determine if it wants to offer a competitive bid to provide auxiliary content to fulfill that presentation opportunity and how much to bid. In an embodiment, the system provides interest category lists to programmatic platforms that associate pseudonymous wireless communication subscriber identities to interest categories such as "sports enthusiast," "video gamer," "auto enthusiast," "foodie," "crafter," "business traveler," and other interest categories. For example, a first interest category list comprises a plurality of pseudonymous subscriber identities associated with a first interest category, a second interest category list comprises a plurality of pseudonymous subscriber identities associated with a second interest category, a third interest category list comprises a plurality of pseudonymous subscriber identities associated with a third interest category, and so forth. Hence, when a programmatic platform analyzes information provided to it about a presentation opportunity, it may determine the pseudonymous identity of the subscriber contained in the information and then searches the interest category lists to determine an interest category or interest categories to which the pseudonymous subscriber identity (e.g., the subscriber associated with the wireless communication device that has the presentation opportunity) is most closely linked. Then the programmatic platform can determine if it has any appropriate auxiliary content that would likely be compelling for a subscriber having the subject interest for fulfilling the presentation opportunity and how much to bid to fulfill the presentation opportunity by sending auxiliary content. It is noted that the system does not depend upon knowing the identity or phone number of the subscriber or the wireless communication device: it can associate the pseudonymous subscriber identity to the interest category without knowing those private identities.

The system also provides behavioral site lists to programmatic platforms that associate web site addresses and application identities to interest categories. When a programmatic platform analyzes information provided to it about a presentation opportunity it determines a web site address or an application identity contained in the information and searches behavioral site lists to determine if the web site address or the application identity is contained in one or more of the behavioral site lists. If the web site address or application identity matches to one of the behavioral site lists, where each different behavioral site list associates to a different interest category, the programmatic platform can determine if it has any appropriate auxiliary content that would likely be compelling for a subscriber visiting the subject web site or application and hence deemed to be interested in the subject interest for fulfilling the presentation opportunity and how much to bid to fulfill the presentation opportunity by sending auxiliary content.

The system builds the interest category lists based in part on SDK data provided by wireless communication devices used by subscribers of a wireless communication service provider, herein referred to as the home service provider to distinguish from other wireless communication service providers that are referred to as other service providers. The SDK data may identify applications that the subscribers have installed and may execute on their devices. The applications that the subscribers install on their devices can be analyzed to determine that the subscriber is likely to have an interest in a particular interest category. The association of application identities to interest categories may be configured into the system as a rule or criteria. The analysis of the installed applications may take into account how often a subscriber launches the application and how long they remain in the application after they have launched it.

The system also builds the interest category lists based in part on broadband data that is collected from the service provider network nodes that may identify web sites and application sites (e.g., application servers) visited by subscribers, how often they visit the web sites, how long they remain on the web sites, and other information. In an embodiment, the system may build the interest category lists based in part on third-party application ownership data. A behavioral persona generation application executing on a computer system analyzes the SDK data and the broadband data to build the interest category lists. In an embodiment, custom interest categories may be defined arbitrarily by users or customers, for example auxiliary content providers and/or programmatic platform operators. The custom interest category may be defined as a combination of one or more of a specific application identity of an application installed on a device, a subscriber age range, a subscriber education level, a subscriber marital status, a subscriber number of children, a subscriber income range, and other demographic criteria. The custom interest category may be defined, in part, by specifying negative states: the subscriber is NOT an Uber driver, the subscriber does NOT own a vehicle, etc. As used herein, it is understood that interest categories and interest category lists may be associated with either interest categories or custom interest categories.

The system receives bid request data (e.g., the information about presentation opportunities) associated with wireless communication devices that are subscribed to the home service provider. At least some of the bid request data provides the pseudonymous subscriber identity of a subscriber as well as various additional information such as a web site address, an application identity, a make and model of the wireless communication device involved, a screen resolution of the wireless communication device involved, an operating system installed on the wireless communication device involved, a location of the wireless communication device, and potentially a great deal of other information. In an embodiment, the bid request data associated with subscribers who opt-out of providing pseudonymous subscriber identities do not include a pseudonymous subscriber identity. In an embodiment, the bid request data may comprise 5 or more fields, 10 or more fields, 20 or more fields, 50 or more fields, 80 or more fields, 100 or more fields, and less than 1000 fields. In an embodiment, the bid data is formatted according to an OpenRTB bid request format.

A behavioral site list generation application executing on the computer system works on the bid request data and on the interest category lists to generate the behavioral site lists. In an embodiment, the behavioral site list generation application encompasses a machine learning model that comprises algorithms as well as data (e.g., the bid request data and the interest category lists). The machine learning model adapts itself as it receives new data. At the same time the behavioral site list generation application builds behavioral site lists using the machine learning model. In another embodiment, however, the behavioral site list generation application does not include a machine learning model and comprises statically configured program instructions, rules, or other logic to analyze bid data, work on the interest category lists, and generate the behavioral site lists.

In an embodiment, the behavioral site list generation application can analyze the bid request data that contains pseudonymous subscriber identities, determine a web site or an application identity associated with the bid request data, find what interest category lists the pseudonymous subscriber identities are associated with, determine if pseudonymous subscriber identities identified in a particular interest category list over-index on a given web site or application identity, and from discovered over-indexing infer that those web sites or application identities are predictors or proxies for different interest categories. For example, if a first web site over-indexes for pseudonymous subscriber identities in a sports enthusiast interest category, that web site can be deemed predictive of sports enthusiast interest. If a second web site over-indexes for pseudonymous subscriber identities in a business traveler interest category, that web site can be deemed predictive of business traveler interest. Thus, the programmatic platform can inspect a bid request, identify a web site or an application identity associated in the bid request, search the behavioral site list, and if it is found the web site is in the foodie behavioral site list, the programmatic platform can expect that the subscriber associated with that bid request would have above average interest in auxiliary content related to the foodie interest. It is noted that this method is not dependent on cookies or presence of pseudonymous subscriber identities. It is additionally noted that this method is not dependent on the wireless communication device being supported by the home wireless communication service provider.

In an embodiment, the behavioral persona generation application rebuilds the interest category lists periodically, whereby to keep the interest category lists updated for evolving subscriber interests, for example quarterly. The behavioral site list generation application also rebuilds the behavioral site lists periodically using current data, whereby to keep the behavioral site lists updated for newly emerging web sites and applications and for evolving subscriber interests. The present disclosure teaches a technical solution to the technical problem of efficiently bidding to present auxiliary content to wireless communication devices. The technical solution relies upon three independent sources of data that promotes more precise and up-to-date appraisal of subscriber interests whereby to provide them with engaging, compelling content while minimizing sending unwanted media content that represents a waste of communication resources.

Figure 1B:
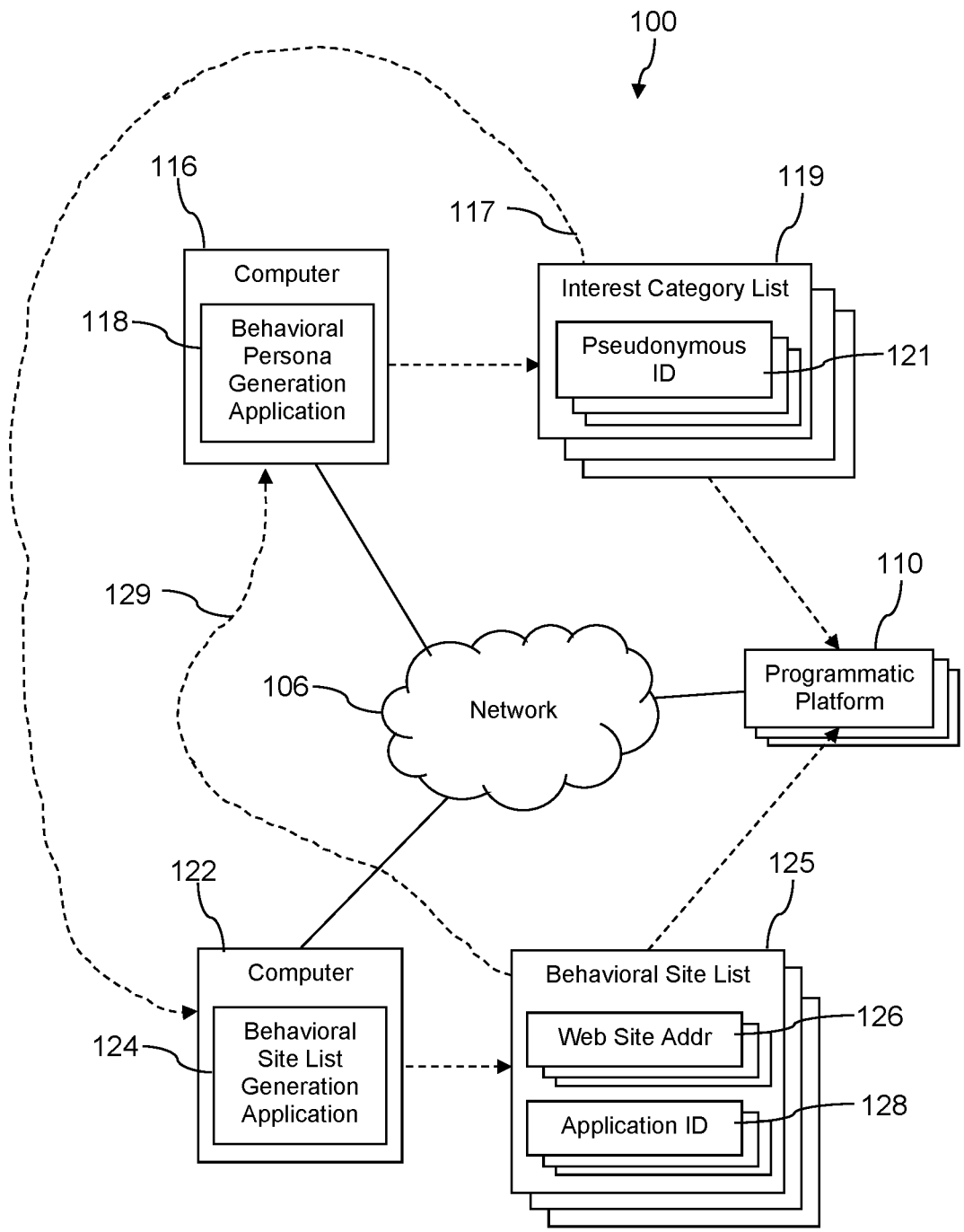

Turning now to FIG. 1A and FIG. 1B, a system 100 is described. In an embodiment, the system 100 comprises a plurality of wireless communication devices 102 that receive wireless communication links from a plurality of cell sites 104 that communicatively couple the devices 102 to a network 106 and therethrough communicatively couple the devices 102 to Internet sites 108. The wireless communication devices 102 may comprise mobile phones, smart phones, personal digital assistants (PDAs), wearable computers, headset computers, laptop computers, tablet computers, notebook computers, and other devices. The cell sites 104 may provide wireless communication links to the devices 102 according to one or more of a 5G, a long-term evolution (LTE), a code division multiple access (CDMA), a global system for mobile communications (GSM) telecommunication protocol. It is understood that different ones of the wireless communication devices 102 may be different kinds of devices—for example a first device 102 may be a smart phone, a second device 102 may be a wearable computer, a third device 102 may be a laptop computer, and so on. In the same way, a first cell site 104 may provide a wireless communication link according to a 5G telecommunication protocol, a second cell site 104 may provide a wireless communication link according to an LTE telecommunication protocol, a third cell site 104 may provide a wireless communication link according to a CDMA telecommunication protocol, and so on. The communication network 106 comprises one or more public networks, one or more private networks, or a combination thereof.

The Internet sites 108 may comprise web sites that provide content to web browsers that execute on the wireless communication device 102. The Internet sites 108 may comprise application servers that provide access to application services to application clients executing on the wireless communication device 102. For example, a gaming application client may execute on a wireless communication device 102 and connect to a corresponding application server that executes on one of the Internet sites 108.

When a web browser on a wireless communication device 102 presents content from a web site (e.g., one of the Internet sites 108) selected by the user of the wireless communication device 102, this content may be referred to as selected content or primary content. There may be space in a display of the wireless communication device 102 to present auxiliary content, for example in a banner space at the top of the display, in a left-hand side of the display, in a right-hand side of the display, or in a bottom of the display. Such auxiliary content may comprise a public service announcement, an advertisement, or a special interest announcement. Likewise, when an application client executes on the wireless communication device 102 there may be room proximate to the display of the application to present auxiliary content.

It is desirable that such auxiliary content be targeted to the user of the wireless communication device 102 such that the auxiliary content is deemed useful or interesting to that user. It is desirable because that user does not want to be inconvenienced by auxiliary content that is of no interest to him or her. A user who owns a home may not welcome seeing auxiliary content directed to renter's insurance. A user who is not interested in sports may not welcome seeing auxiliary content directed to football score updates. A user who lives in rural Illinois may not welcome seeing auxiliary content directed to ocean kayaking in Puget Sound. Additionally, sending such unwelcomed auxiliary content can be deemed a waste of limited wireless communication resources. By providing auxiliary content that is targeted to the interests and attributes associated with a user, delivering unwelcomed auxiliary content can be avoided and the likelihood that the user will be engaged by the auxiliary content is increased. It is a technical challenge, however, to assess the interests and attributes associated with the user timely so as to select auxiliary content consistent with these interests and attributes and deliver the selected auxiliary content to the wireless communication device 102 of that user.

The system 100 further comprises a first data store 112 that stores broadband data related to interactions of some of the wireless communication devices 102 with the Internet sites 108. This broadband data can include kinds of web sites visited by the users of the devices 102, kinds of applications visited by the users of the devices 102, durations of time that the users visited the web sites and applications, and other information. The broadband data stored in the first data store 112 may be restricted to information on activities of wireless communication devices 102 that are associated with a wireless communication subscription account with a first wireless communication service provider which will be referred to as a home service provider. This is because the first data store 112 may be maintained by the first wireless communication service provider, and the service provider does not have access to like information on the wireless communication activities in other wireless communication networks.

The system 100 further comprises a second data store 114 that stores SDK data collected by SDKs installed on some of the wireless communication devices 102 that are associated with subscription accounts with the home service provider. The SDKs may be application clients installed on some of the wireless communication devices 102 that provide a tool for subscribers to manage their subscription accounts with the home service provider. The SDKs may be user installed applications of various kinds, such as gaming applications, food recipe sharing applications, travel management applications, and other applications. The SDK data stored in the second data store 114 identifies what applications are installed on wireless communication device 102 that have a wireless communication service subscription with the home service provider. Again, the SDK data stored in the second data store 114 may be restricted to SDK data associated with wireless communication devices 102 that have a subscription account with the home service provider, because the home service provider maintains the second data store 114, and the home service provider does not have access to SDK data associated with other devices 102 that have subscription accounts with other service providers. The SDKs may monitor a variety of activities on the wireless communication devices 102, capture this information, and send it back to be stored as SDK data in the second data store 114. Simply the identification of user installed applications can provide clues as to subscriber interests.

The system 100 further comprises a first computer 116 that executes a behavioral persona generation application 118. The behavioral persona generation application 118 may be operated by the home service provider. The behavioral persona generation application 118 retrieves broadband data from the first data store 112 and SDK data from the second data store 114, normalizes the broadband data and the SDK data, and then generates a plurality of interest category lists 119 that each comprises a plurality of pseudonymous subscriber identities 121. In some contexts, the interest category lists 119 may be referred to as behavioral personas or as audiences. In an embodiment, the subscriber identities may be pseudonymized before the SDK data and the broadband data are received by the behavioral persona generation application 118 from the data stores 112 and 114. Alternatively, the subscriber identities may be present in the SDK data and the broadband data when received, and the behavioral personal generation application 118 may pseudonymize the subscriber identities. A pseudonymous subscriber identity is an identity that can be linked to transactions and opportunity bid requests associated with a particular wireless communication device 102 (which by proxy is associated to the subscriber) but which conceals the real identity of the subscriber, whereby to protect the privacy of that subscriber. In an embodiment, the pseudonymous subscriber identity is not a randomized value but is a hash of the actual subscriber identity—for example a hash of the subscriber phone number, a hash of the mobile equipment identity (MEID) associated with the wireless communication device 102, or a hash of another actual subscriber identity. In an embodiment, the pseudonymous subscriber identity may be a randomly generated value.

In assigning pseudonymous subscriber identities to interest category lists, the behavioral persona generation application 118 can evaluate what Internet sites have been visited by the subscriber, how much time the subscriber remained on that Internet site, how often the subscriber returned to that Internet site, and other considerations, and from these determine that the subscriber can be associated with one or more interest categories. Interest categories can include "sports enthusiast," "video gamer," "auto enthusiast," "foodie," "crafter," "business traveler," and other interest categories. Likewise, the behavioral persona generation application 118 can evaluate what applications are installed on the wireless communication devices 102 of subscribers of the home network and determine that the subscriber can be associated with one or more interest category lists based on the evaluation of installed applications. In an embodiment, the behavioral persona generation application 118 may associate pseudonymous subscriber identities to interest category lists based at least in part on pre-defined criteria and/or rules defined in terms of installed applications and in terms of web site visiting behaviors. It is pointed noted that some subscribers may be associated to two or more interest category lists. For example, a single subscriber may be associated with both the "foodie" interest category list and the "business traveler" interest category list.

In an embodiment, users of the system 100 (e.g., programmatic platforms and/or content providers that are customers of the programmatic platforms) may provide definitions of custom behavioral profiles or custom audiences that constitute a rule for assigning pseudonymous subscriber identities to their custom behavioral profile or custom audience. In this case, the term "behavioral" may be misleading, in that at least some of the criteria or rule for assignment of pseudonymous subscriber identities to the custom audience are unrelated to subscriber behavior but instead are related to facts or states of the user, for example related to demographic information known about the subscriber. The custom audience may be defined, at least in part, by stipulating an age range, an educational attainment, an income range, a marital status, a gender, an age, a subscriber residential zip-code, and other demographic information. As used herein, however, to simplify description, both ordinary behavioral profiles and custom audiences will be referred to by the same common term "behavioral profiles." In either case, the behavioral persona generation application 118 assigns pseudonymous subscriber identities to interest category lists based on the rules and criteria, where some of the interest category lists are associated with a behavioral interest category and others of the interest category lists may be associated with a custom defined audience (e.g., a custom defined category which may or may not be defined in terms of subscriber behavior and/or in terms of subscriber demographics).

The behavioral persona generation application 118 may send the interest category lists 119 to programmatic platforms 110 that send auxiliary content to the wireless communication devices 102. The programmatic platforms 110 analyze a presentation opportunity to identify a pseudonymous subscriber identity and searches one or more of the interest category lists 119. If the pseudonymous subscriber identity is present on one of the interest category lists 119, the programmatic platform 110 may search a content data store (not shown in FIG. 1A or FIG. 1B) to find auxiliary content related to the pertinent interest category. The auxiliary content may be provided by content distribution sources and may include bidding instructions such as a maximum bid amount and an average bid amount for the subject auxiliary content. The content distribution sources may associate bidding instructions to particular interest categories. The programmatic platform 110 may then bid on the presentation opportunity. If the programmatic platform 110 wins the bid for the presentation opportunity, the programmatic platform 110 may serve up the subject auxiliary content to the subject wireless communication device 102 which presents the auxiliary content on its display.

It is noted that the interest category lists 119 are restricted to pseudonymous subscriber identities that have subscription accounts with the home service provider. Thus, when a presentation opportunity associated with a pseudonymous subscriber identity of another service provider is analyzed by the programmatic platforms 110, the interest category lists 119 can provide no assistance in evaluating that presentation opportunity. Additionally, even for presentation opportunities associated with a pseudonymous subscriber identity of the home service provider, if that subscriber has opted-out of providing his or her pseudonymous subscriber identity, there will be no information in the interest category lists 119 for that subscriber and hence the interest category lists 119 can provide no assistance in evaluating presentation opportunity associated with that subscriber. It is noted that the current trend is towards deprecation and eventual disuse of pseudonymous subscriber identities. In the long haul, the use of the interest category lists 119 for determining targeted content is likely to become obsolete or at least ineffective for most presentation opportunities.

The system 100 further comprises a second computer 122 that executes a behavioral site list generation application 124. The behavioral site list generation application 124 may be operated by the home service provider. In an embodiment, the first computer 116 and the second computer 122 are encompassed within the same computer system. For example, the behavioral persona generation application 118 and the behavioral site list generation application 124 may execute on the same computer system as separate, concurrent processes on a single server; on different virtual servers as separate concurrent processes; or on different servers within a distributed computer system as separate concurrent processes. Computer systems are described further hereinafter.

The behavioral site list generation application 124 retrieves bid request data from a third data store 120. The bid request data comprises information on bid requests provided to the home service provider by the programmatic platforms 110. In an embodiment, the bid request data pertains exclusively to wireless communication devices 102 that have a wireless communication subscription with the home service provider. For example, the third data store 120 may be maintained by the home service provider, and the programmatic platforms 110 may share only the bid requests associated with wireless communication devices 102 that receive subscription services with the home service provider. In another embodiment, however, the bid request data may pertain to wireless communication devices 102 that have subscription services with the home service provider and to other devices 102 that have subscription services with other service providers.

The bid request data may comprise a plurality of bid requests. Each bid request may comprise one or more items selected from the list consisting of a pseudonymous subscriber identity, a web site address (e.g., a uniform resource locator (URL)), an application identity, a description of a display (e.g., a display resolution) of a wireless communication device associated with the bid request, a make and model of a wireless communication device associated with the bid request, an operating system of the wireless communication device associated with the bid request, and an indication of geographical location of a wireless communication device associated with the bid request. In an embodiment, the bid requests may be formatted according to an Open RTB bid request format. It is understood that different bid requests may comprise more or fewer fields than other bid requests. The bid request data may be accumulated by the programmatic platforms 110 and periodically stored to the third data store 120, for example every hour, every day, once a week, or on some other periodic interval. It is understood that at least some of the bid requests do not have pseudonymous subscriber identities.

The behavioral site list generation application 124 also retrieves information on the interest category lists 119 generated by the behavioral personal generation application 118, as indicated by feed-forward path 117 in FIG. 1B. In an embodiment, the behavioral site lists 125 may be generated by the behavioral site list generation application 124 by determining that pseudonymous subscriber identities 121 associated with particular interest categories, as indicated by the interest category lists 119 generated by the behavioral persona generation application 118, over-index on particular web site addresses and/or application identities. Said in other words, if subscribers associated with an interest category tend to visit a web site or use an application more commonly than a randomly selected set of subscribers, the web site or application are of above average interest to the set of subscribers who are associated to the interest category. Therefore, the web site or application can be used as a proxy for an interest category. A subscriber associated with a pseudonymous subscriber identity that is visiting a web site that over-indexes for "sports enthusiast" interest category is a good candidate for sending auxiliary content to that is deemed of interest to those subscribers in the "sports enthusiast" interest category.

In practice, a threshold for over-indexing may be established which can be used to associate web sites or applications to an interest category. Indexing at a value of 100 is considered to be the measure of random association (e.g., no particular association). The threshold may be an indexing value of 150, 180, 200, 250, 300, or some other threshold over-indexing value. It is observed that the use of over-indexing provides a normalized scale for all calculations. In an embodiment, different over-indexing thresholds may be employed for different interest categories, for example when the numbers of pseudonymous subscriber identities associated to an interest category is not large enough to have high confidence in the sample size.

The behavioral site list generation application 124 generates a plurality of behavioral site lists 125 based on the over-indexing analysis, where each behavioral site list 125 identifies web site addresses 126 and application identities 128 that are deemed to be associated with an interest category. For example, the behavioral site list generation application 124 may generate a first site list associated with a "sports enthusiast" interest category, a second site list associated with a "video gamer" interest category, a third site list associated with an "auto enthusiast" interest category, and so on. The first site list, for example, would comprise a plurality of web site addresses and application identities that are frequented or are deemed pertinent to a "sports enthusiast" interest category. The second site list, for example, would comprise a plurality of web site addresses and application identities that are frequented or are deemed pertinent to a "video gamer" interest category.

In an embodiment, with continued deprecation of pseudonymous subscriber identities, it is contemplated that a machine learning model may be added to the behavioral site list generation application 124 that can be used to analyze bid requests, associate the bid requests to interest categories, and then generate the behavioral site lists 125 without having to depend upon the interest category lists 119 that may have become obsolete due to the disappearance of pseudonymous subscriber identities. In that embodiment, the behavioral site list generation application 124 processes the bid request data and the interest category lists 119 to train a machine learning model that comprises data and associated algorithms. Even a small continuation of pseudonymous subscriber identities, for example subscribers who may have been given special consideration to opt-in for supporting pseudonymous subscriber identities, can be useful in building and sustaining such a machine learning model. Alternatively, the machine learning model can operate without any reference at all to interest category lists 119 if the appropriate training data to map bid request data to interest categories is provided. The machine learning model may be either separate from the behavioral site list generation application 124 or integrated within the behavioral site list generation application 124.

The behavioral site lists 125 generated by the behavioral site list generation application 124 are transmitted by the behavioral site list generation application 124 to the programmatic platforms 110. The programmatic platforms 110 can then use both the interest category lists 119 provided by the behavioral personal generation application 118 and the behavioral site lists 125 provided by the behavioral site list generation application 124 to analyze presentation opportunities and bid requests to determine what auxiliary content would be suitable for fulfilling the presentation opportunity and how much to bid to win the approval to fulfill the presentation opportunity. It is noted that the interest category lists 119, being populated with pseudonymized identities of subscribers of the home service provider, are only useful in analyzing bid requests that are associated to subscribers of the home service provider that have not opted-out of providing a pseudonymous subscriber identity. It is further noted that over time, fewer and fewer of presentation opportunities may be expected to include pseudonymous subscriber identities even when associated to a wireless communication device 102 subscribed with the home service provider for reasons given above. By contrast, because the behavioral site lists 125 identify web site addresses and application identities that may be accessed by wireless communication device users of any wireless service provider, the behavioral site lists 125 provide benefits to the programmatic platforms 110 evaluating presentation opportunities not only for subscribers of the home service provider that have not opted-out of providing pseudonymous subscriber identities but also for subscribers of other service providers and for subscribers of the home service provider who have opted-out of providing pseudonymous subscriber identities. For example, if a bid request lists pseudonymous subscriber identity 655321 and this pseudonymous subscriber ID is associated with another service provider, the programmatic platform 110 can extract no guidance from the interest category lists 119 which are built using only pseudonymous subscriber identities associated with the home service provider. If, however, this bid request lists a web site or an application identity that is present in one of the behavioral site lists 125, the programmatic platform 110 can extract guidance from the behavioral site list 125 provided by the behavioral site list generation application operated by the home service provider notwithstanding that the pseudonymous subscriber identity is associated with another service provider.

Having developed the behavioral site lists 125 in this way, it is understood that the behavioral site lists 125 can be used to improve the work performed by the behavioral persona generation application 118. This is indicated by the feedback path 129 in FIG. 1B. Thus, pseudonymous subscriber identities that are identified to be visiting web sites and applications that over-index for an interest category, as indicated by the behavioral site lists 125, can be added to interest category lists 119.

Figure 2A:
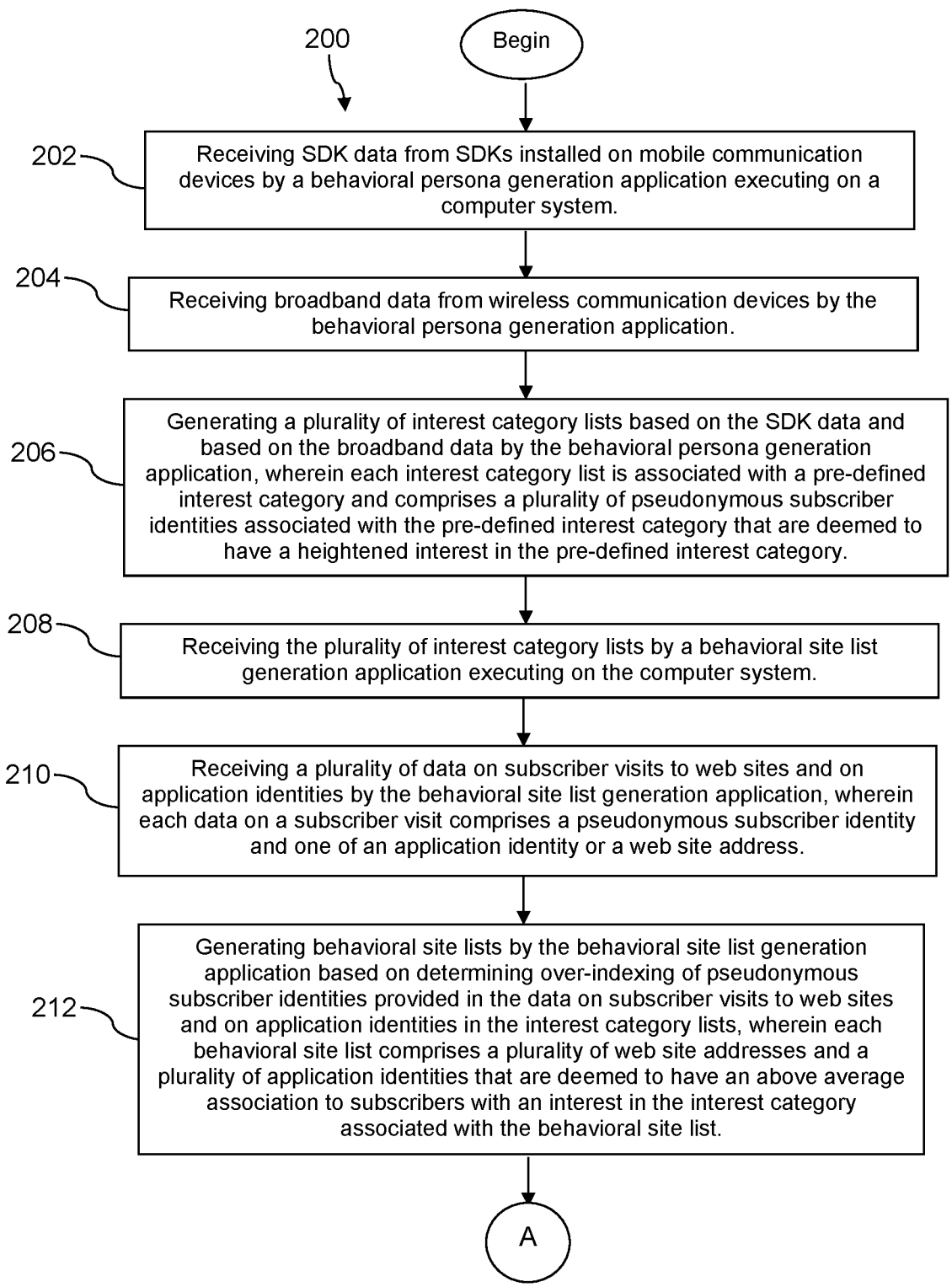
FIG. 2A and FIG. 2B is a flowchart of a method according to an embodiment of the disclosure.
Figure 2B:
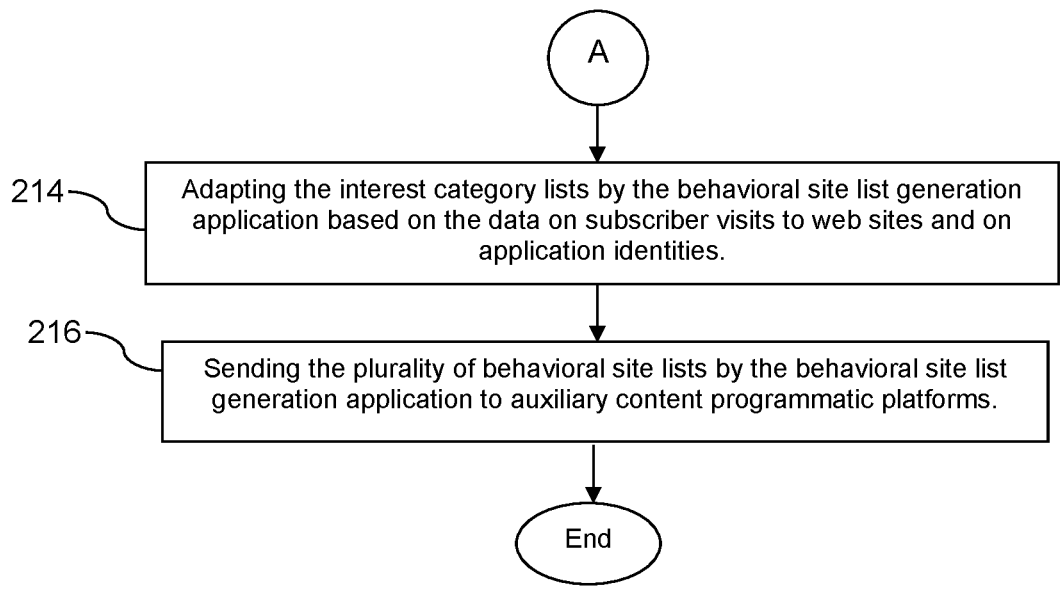

Turning now to FIG. 2A and FIG. 2B, a method 200 is described. In an embodiment, method 200 is a method of generating a plurality of behavioral site lists. At block 202, the method 200 comprises receiving SDK data from SDKs installed on wireless communication devices by a behavioral persona generation application executing on a computer system. In an embodiment, the SDK data comprises identification of some applications installed on some of the wireless communication devices 102 that have subscriptions with a home service provider that maintains the second data store 114, where the application identities are associated to pseudonymous subscriber identities. At block 204, the method 200 comprises receiving broadband data from wireless communication devices by the behavioral persona generation application. In an embodiment, the broadband data comprises web site and application server site visiting information associated with some of the wireless communication devices 102 that have subscriptions with the home service provider that maintains the first data store 112, where the broadband data is associated to pseudonymous subscriber identities.

At block 206, the method 200 comprises generating a plurality of interest category lists based on the SDK data and based on the broadband data by the behavioral persona generation application, wherein each interest category list is associated with a pre-defined interest category and comprises a plurality of pseudonymous subscriber identities associated with the pre-defined interest category that are deemed to have a heightened interest in the pre-defined interest category. In an embodiment, generating the plurality of interest category lists is based partly on determining a duration of time a subscriber stays at web sites and stays on applications. In an embodiment, generating the plurality of interest category lists is based partly on determining a frequency of a subscriber revisits web sites and revisits applications. In an embodiment, generating the plurality of interest category lists is based partly on determining the applications that are installed on the wireless communication devices 102. In an embodiment, the processing of block 206 may be based on criteria or rules enacted by programmers or coders. In an embodiment, the pre-defined interest categories comprise three or more of a sports enthusiast interest category, a gamer interest category, an auto enthusiast interest category, a foodie interest category, a crafter interest category, and a business traveler interest category. In an embodiment, some of the pre-defined interest categories are defined by programmatic platform operators or by auxiliary content provider operators, for example by defining a custom behavioral persona or a custom audience. As described further above, such a custom audience can be defined in terms of behavioral characteristics (visiting particular web sites, how long visits last, applications installed on the wireless communication device 102) and/or in terms of demographics (age range, educational level, residential zip-code, income range, gender, marital status, etc.) associated with pseudonymous subscriber identities.

At block 208, the method 200 comprises receiving the plurality of interest category lists by a behavioral site list generation application executing on the computer system. At block 210, the method 200 comprises receiving a plurality of bid requests by the behavioral site list generation application, wherein each bid request comprises a pseudonymous subscriber identity and one of an application identity or a web site address. In an embodiment, at least some of the bid requests are formatted in OpenRTB format. In an embodiment, the bid requests further comprise at least one item of information selected from the list consisting of a make and model of a wireless communication device, a screen resolution of a wireless communication device, an operating system of the wireless communication device, and a location of a wireless communication device.

At block 212, the method 200 comprises generating behavioral site lists by the behavioral site list generation application based on determining over-indexing of pseudonymous subscriber identities provided in the data on subscriber visits to web sites and on application identities in the interest category lists, wherein each behavioral site list comprises a plurality of web site addresses and a plurality of application identities that are deemed to have an above average association to subscribers with an interest in the interest category associated with the behavioral site list. In an embodiment, the processing of block 212 comprises adapting a behavioral site list machine learning model by the behavioral site list generation application based on the plurality of interest category lists and the plurality of bid requests. In an embodiment, adapting the behavioral site list machine learning model comprises analyzing over-indexing of the bid request data and the interest category lists. In this embodiment, then, generating behavioral site lists by the behavioral site list generation application is based on the machine learning model.

At block 214, the method 200 comprises adapting the interest category lists by the behavioral site list generation application based on subscriber visits to web sites and on application identities and, optionally, based on the machine learning model. At block 216, the method 200 comprises sending the plurality of behavioral site lists by the behavioral site list generation application to auxiliary content programmatic platforms, whereby the programmatic platforms are enabled to better target content to subscribers based on the web sites and applications that the subscribers access.

Figure 3:
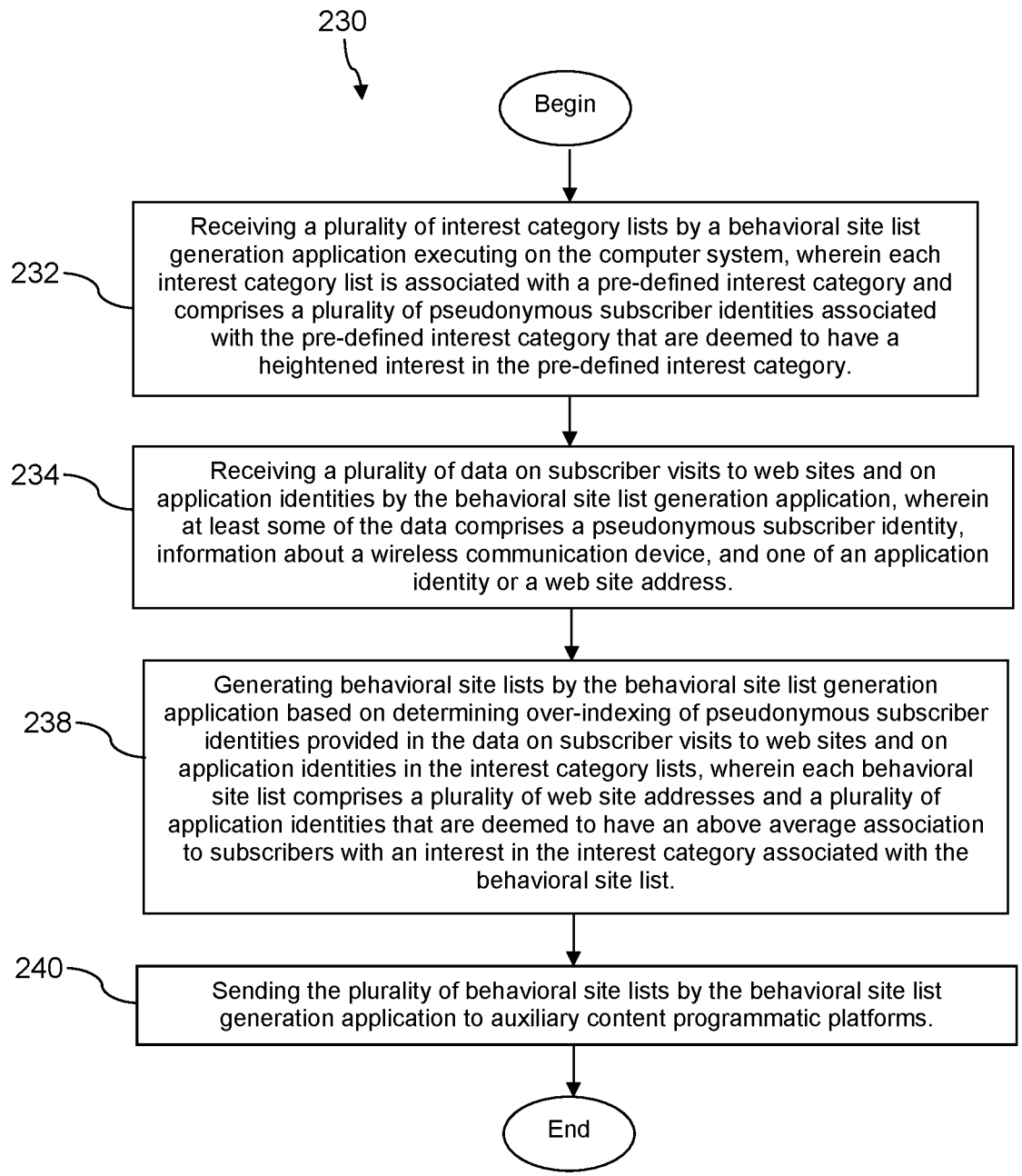
FIG. 3 is a flowchart of another method according to an embodiment of the disclosure.

Turning now to FIG. 3, a method 230 is described. In an embodiment, the method 230 is a method of generating a plurality of behavioral site lists. At block 232, the method 230 comprises receiving a plurality of interest category lists by a behavioral site list generation application executing on the computer system, wherein each interest category list is associated with a pre-defined interest category and comprises a plurality of pseudonymous subscriber identities associated with the pre-defined interest category that are deemed to have a heightened interest in the pre-defined interest category. In an embodiment, the pre-defined interest categories comprise behavioral personas as well as custom audiences that are established based on definitions, criteria, or rules input by one or more programmatic platform users or by one or more auxiliary content providers.

At block 234, the method 230 comprises receiving a plurality of data on subscriber visits to web sites and on application identities by the behavioral site list generation application, wherein at least some of the data comprise a pseudonymous subscriber identity, information about a wireless communication device, and one of an application identity or a web site address. In an embodiment, the wireless communication devices associated with the data comprise mobile phones, wearable computers, laptop computers, tablet computers, and notebook computers. In an embodiment, the data on subscriber visits to web sites and on application identities is provided in bid requests. In an embodiment, the bid requests are in OpenRTB format.

At block 238, the method 230 comprises generating behavioral site lists by the behavioral site list generation application based on determining over-indexing of pseudonymous subscriber identities provided in the data on subscriber visits to web sites and on application identities in the interest category lists, wherein each behavioral site list comprises a plurality of web site addresses and a plurality of application identities that are deemed to have an above average association to subscribers with an interest in the interest category associated with the behavioral site list. In an embodiment, the behavioral site list generation application generates the behavioral site lists periodically. In an embodiment, the behavioral site list generation application generates the behavioral site lists once per day, once per week, once every two weeks, once per month, or once per quarter, twice per year, once per year, or some other periodic interval. By regenerating the behavioral site lists, the information can be adapted and evolves as new web sites are introduced, as new applications are deployed, and as subscriber behaviors evolve over time. In an embodiment, at block 238, the method 230 comprises adapting a behavioral site list machine learning model by the behavioral site list generation application based on the plurality of interest category lists and the plurality of bid requests, wherein generating behavioral site lists by the behavioral site list generation application is based on the machine learning model.

At block 240, the method 230 comprises sending the plurality of behavioral site lists by the behavioral site list generation application to auxiliary content programmatic platforms. In an embodiment, the method 230 further comprises receiving auxiliary content presentation performance logs by the behavioral site list generation application and adapting the behavioral site list machine learning model by the behavioral site list generation application based on analyzing the auxiliary content presentation performance logs. In an embodiment, the auxiliary content presentation performance logs identify subscriber clicks on auxiliary content and transactions.

Figure 4:
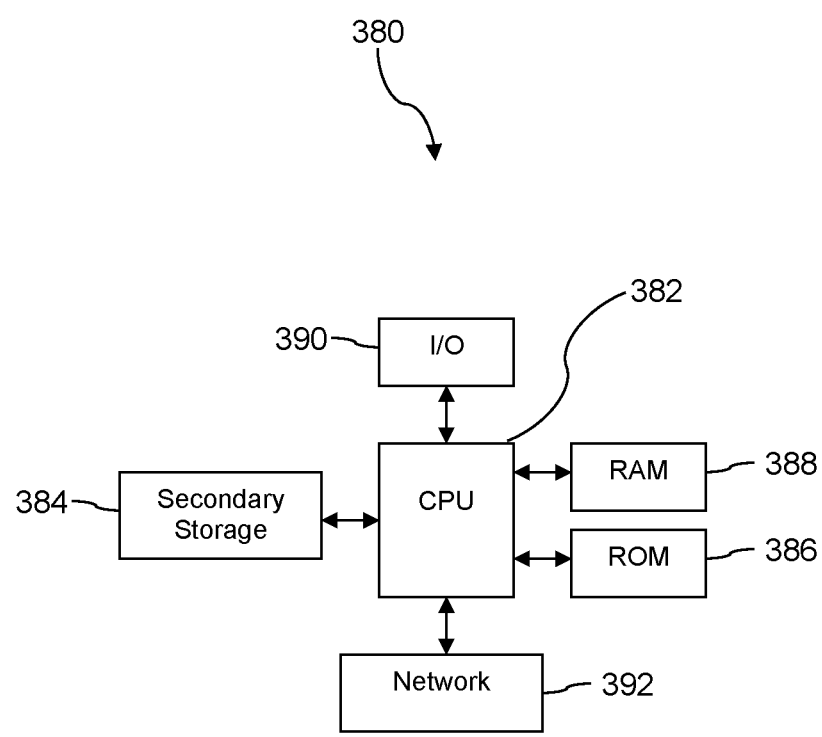
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system that generates site lists associated with interest categories based on associating a plurality of pseudonymous subscriber identities to different interest categories, receiving data on subscriber visits to web sites and on application identities, and identifying web sites and application sites for which pseudonymous subscriber identities associated with interest categories over-index on, comprising:
    a first data store comprising software development kit (SDK) data collected from SDKs installed on wireless communication devices subscribed to receive wireless communication service from a first wireless communication service provider;
    a second data store comprising broadband data collected from the wireless communication devices subscribed to receive wireless communication service from the first wireless communication service provider;
    a processor;
    a non-transitory memory communicatively coupled to the processor;
    a behavioral persona generation application stored in the non-transitory memory that, when executed by the processor:
        reads the SDK data from the first data store,
        reads the broadband data from the second data store, and
        generates a plurality of interest category lists, wherein each interest category list comprises a plurality of pseudonymous subscriber identities associated with an interest category and associated with the first wireless communication service provider;
    a behavioral site list generation application stored in the non-transitory memory that, when executed by the processor:
        receives the plurality of interest category lists created by the behavioral persona generation application,
        receives data on subscriber visits to web sites and on application identities from auxiliary content demand side platforms (programmatic platforms), wherein the data are associated with wireless communication devices subscribed to receive wireless communication service from the first wireless communication service provider,
        training a machine learning model based on the interest category lists including the pseudonymous subscriber identities associated with interest categories and on the data on subscriber visits to web sites, wherein the training enables the machine learning model to subsequently predict an interest category of a user based on visits to websites, and wherein the machine learning model continuously adapts and retrains itself as it receives new data,
        generate, via the machine learning model, a plurality of behavioral site lists based on determining over-indexing of pseudonymous subscriber identities provided in the data on subscriber visits to web sites and on application identities in the interest category lists, wherein each behavioral site list is associated with an interest category and comprises a plurality of web site addresses and a plurality of application identities,
        transmits the plurality of behavioral site lists to auxiliary content programmatic platforms;
        receives, from the auxiliary content programmatic platforms, auxiliary content presentation performance logs; and
        retrains, based on the auxiliary content presentation performance logs, the machine learning model, wherein the machine learning model is transformed by the retraining to increase accuracy of subsequent behavioral site lists generated subsequent to the retraining.

2. The system of claim 1, wherein the wireless communication devices comprise mobile phones, wearable computers, laptop computers, notebook computers, and tablet computers.

3. The system of claim 1, wherein the interest categories comprise three or more of a sports interest category, a gamer interest category, an auto enthusiast interest category, a foodie interest category, a crafter interest category, and a business traveler interest category.

4. The system of claim 1, wherein the data on subscriber visits to web sites and on application identities comprises bid requests in OpenRTB format.

5. The system of claim 1, wherein the behavioral site lists enable the auxiliary content programmatic platforms to deliver targeted auxiliary content to wireless communication devices that receive wireless communication service from a wireless communication service provider that is different from the first wireless communication service provider.

6. The system of claim 1, wherein the behavioral site list generation application further adapts the interest category lists based on the data on subscriber visits to web sites and on application identities and based on the behavioral site lists and sends the adapted interest category lists to the behavioral persona generation application.

7. A method of generating a plurality of behavioral site lists associated with interest categories based on associating a plurality of pseudonymous subscriber identities to different interest categories, receiving data on subscriber visits to web sites and on application identities, and identifying web sites and application sites for which pseudonymous subscriber identities associated with interest categories over-index on, comprising:

receiving software development kit (SDK) data from SDKs installed on wireless communication devices by a behavioral persona generation application executing on a computer system;

receiving broadband data from wireless communication devices by the behavioral persona generation application;

generating a plurality of interest category lists based on the SDK data and based on the broadband data by the behavioral persona generation application, wherein each interest category list is associated with a pre-defined interest category and comprises a plurality of pseudonymous subscriber identities associated with the pre-defined interest category that are deemed to have a heightened interest in the pre-defined interest category;

receiving the plurality of interest category lists by a behavioral site list generation application executing on the computer system;

receiving a plurality of data on subscriber visits to web sites and on application identities by the behavioral site list generation application, wherein each data on a subscriber visit comprises a pseudonymous subscriber identity and one of an application identity or a web site address;

training a machine learning model based on the interest category lists including the pseudonymous subscriber identities associated with interest categories and on the data on subscriber visits to web sites, wherein the training enables the machine learning model to subsequently predict an interest category of a user based on visits to websites, and wherein the machine learning model continuously adapts and retrains itself as it receives new data;

generating, via the machine learning model, behavioral site lists by the behavioral site list generation application based on determining over-indexing of pseudonymous subscriber identities provided in the data on subscriber visits to web sites and on application identities in the interest category lists, wherein each behavioral site list comprises a plurality of web site addresses and a plurality of application identities that are deemed to have an above average association to subscribers with an interest in the interest category associated with the behavioral site list;

adapting the interest category lists by the behavioral site list generation application based on the data on subscriber visits to web sites and on application identities;

sending the plurality of behavioral site lists by the behavioral site list generation application to auxiliary content programmatic platforms;

receiving, from the auxiliary content programmatic platforms, auxiliary content presentation performance logs; and retraining, based on the auxiliary content presentation performance logs, the machine learning model, wherein the machine learning model is transformed by the retraining to increase accuracy of subsequent behavioral site lists generated subsequent to the retraining.

8. The method of claim 7, wherein the pre-defined interest categories comprise three or more of a sports enthusiast interest category, a gamer interest category, an auto enthusiast interest category, a foodie interest category, a crafter interest category, and a business traveler interest category.

9. The method of claim 7, wherein at least some of the data on subscriber visits to web sites and on application identities are formatted in OpenRTB format.

10. The method of claim 7, wherein the data on subscriber visits to web sites and on application identities further comprise at least one item of information selected from the list consisting of a make and model of a wireless communication device, a screen resolution of a wireless communication device, and a location of a wireless communication device.

11. The method of claim 7, wherein generating the plurality of interest category lists is based partly on determining a duration of time a subscriber stays at web sites and stays on applications.

12. The method of claim 7, wherein generating the plurality of interest category lists is based partly on determining a frequency of a subscriber revisits web sites and revisits applications.

13. A method of generating a plurality of behavioral site lists associated with interest categories based on associating a plurality of pseudonymous subscriber identities to different interest categories, receiving data on subscriber visits to web sites and on application identities, and identifying web sites and application sites for which pseudonymous subscriber identities associated with interest categories over-index on, comprising:

receiving a plurality of interest category lists by a behavioral site list generation application executing on a computer system, wherein each interest category list is associated with a pre-defined interest category and comprises a plurality of pseudonymous subscriber identities associated with the pre-defined interest category that are deemed to have a heightened interest in the pre-defined interest category;

receiving a plurality of data on subscriber visits to web sites and on application identities by the behavioral site list generation application, wherein each data on a subscriber visit comprises a pseudonymous subscriber identity, information about a wireless communication device, and one of an application identity or a web site address;

training a machine learning model based on the interest category lists including the pseudonymous subscriber identities associated with interest categories and on the data on subscriber visits to web sites, wherein the training enables the machine learning model to subsequently predict an interest category of a user based on visits to websites, and wherein the machine learning model continuously adapts and retrains itself as it receives new data;

generating, via the machine learning model, behavioral site lists by the behavioral site list generation application based on determining over-indexing of pseudonymous subscriber identities provided in the data on subscriber visits to web sites and on application identities in the interest category lists, wherein each behavioral site list comprises a plurality of web site addresses and a plurality of application identities that are deemed to have an above average association to subscribers with an interest in the interest category associated with the behavioral site list;

sending the plurality of behavioral site lists by the behavioral site list generation application to auxiliary content programmatic platforms;

receiving, from the auxiliary content programmatic platforms, auxiliary content presentation performance logs; and retraining, based on the auxiliary content presentation performance logs, the machine learning model, wherein the machine learning model is transformed by the retraining to increase accuracy of subsequent behavioral site lists generated subsequent to the retraining.

14. The method of claim 13, wherein the wireless communication devices comprise mobile phones, wearable computers, laptop computers, tablet computers, and notebook computers.

15. The method of claim 13, wherein the data on subscriber visits to web sites and on application identities are in OpenRTB format.

16. The method of claim 13, wherein the behavioral site list generation application generates the behavioral site lists periodically.

17. The method of claim 13, further comprising receiving auxiliary content presentation performance logs by the behavioral site list generation application and generating the behavioral site lists in part based on the auxiliary content performance logs.

18. The method of claim 17, wherein the auxiliary content presentation performance logs identify subscriber clicks on auxiliary content and transactions.

* * * * *